United States Patent
Wild et al.

(10) Patent No.: US 7,188,605 B2
(45) Date of Patent: Mar. 13, 2007

(54) METHOD AND DEVICE FOR OPERATING AN INTERNAL COMBUSTION ENGINE

(75) Inventors: Ernst Wild, Oberriexingen (DE); Sabine Wegener, Asperg (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 11/084,521

(22) Filed: Mar. 18, 2005

(65) Prior Publication Data

US 2005/0211223 A1    Sep. 29, 2005

(30) Foreign Application Priority Data

Mar. 18, 2004 (DE) .................. 10 2004 013 240

(51) Int. Cl.
*F02D 41/30* (2006.01)

(52) U.S. Cl. .................. 123/396; 123/357; 123/478; 701/104

(58) Field of Classification Search .......... 123/357, 123/358, 478, 480; 701/103, 104, 105
See application file for complete search history.

(56) References Cited

U.S. PATENT DOCUMENTS

| 4,523,570 | A * | 6/1985 | Suzuki et al. | 123/478 |
| 6,862,515 | B2 * | 3/2005 | Vogt | 701/104 |
| 2002/0045983 | A1 | 4/2002 | Vogt | 701/104 |
| 2004/0112334 | A1 * | 6/2004 | Wenzler | 123/396 |

* cited by examiner

*Primary Examiner*—T. M. Argenbright
(74) *Attorney, Agent, or Firm*—Kenyon & Kenyon LLP

(57) ABSTRACT

A method and a device for operating an internal combustion engine are provided, which allow a continuous limiting of the output of the internal combustion engine upon attaining a maximally possible injection duration of an injection valve. The internal combustion engine has at least one actuator for influencing the output of the internal combustion engine and at least one injection valve for supplying fuel to the combustion engine. A maximally possible injection duration for an injection procedure of the at least one injection valve is determined. A variable characterizing the output of internal combustion engine is limited as a function of the maximally possible injection duration by corresponding adjustment of the at least one actuator.

9 Claims, 2 Drawing Sheets

METHOD AND DEVICE FOR OPERATING AN INTERNAL COMBUSTION ENGINE

FIELD OF THE INVENTION

The present invention relates to a method and a device for operating an internal combustion engine.

BACKGROUND INFORMATION

It is already known that the available time for an injection of fuel into a combustion chamber of an internal combustion chamber is limited. In systems where an injection takes place in front of the intake valves of the combustion chamber, the entire injection must be concluded before the individual intake valve closes. The injection for the next aspiration of the cylinder may then begin. In direct gasoline injection, the injection begins after the intake valve has been closed, but must be concluded prior to ignition. The maximum injection duration gets shorter with increasing engine speed. Injection valves are therefore designed such that they are able to discharge the required injection quantity even at maximum rotational speed and full loading of the internal combustion engine. They are tightly configured so that fuel is able to be metered with sufficient precision also at idling speed without loading. Especially in supercharged internal combustion engines, at high engine speed and high loading, an additional enrichment of the air/fuel mixture may be necessary for reasons of component protection. In the described tight configuration of the injection valves, the available time then is insufficient to supply the increased injection quantity for the enrichment. Therefore, methods are known in which the charge of the combustion chamber is reduced by a specific amount by way of an abrupt closing of the throttle valve or via an abrupt lowering of the charge pressure in supercharged engines. If such lowering were not implemented, the supplementary quantity required for the enrichment could not be spray-discharged and the component protection would have no effect.

SUMMARY OF THE INVENTION

In contrast, the method according to the present invention as well as the device for operating an internal combustion engine according to the present invention, have the advantage of ascertaining a maximally possible injection duration for an injection operation of the at least one injection valve, and of limiting a variable characterizing the output of the internal combustion engine by a corresponding adjustment of the at least one actuator as a function of the maximally possible injection duration. This ensures compliance with the maximally possible injection duration without sudden drop in the output of the internal combustion engine at full load and with a required enrichment of the air/fuel-mixture ratio, for instance. In this manner a steady limiting of the output of the internal combustion engine is able to be implemented once a maximally possible injection duration of an injection valve has been reached.

It is particularly advantageous if a maximally possible air charge in a combustion chamber (20) of internal combustion engine (1) is ascertained as a function of the maximally possible injection duration and a predefined air/fuel mixture ratio as a variable characterizing the output of internal combustion engine (1), and if the setting of the at least one actuator (5, 10) is limited as a function of the maximally possible air charge. This prevents an abrupt reduction of the charge, and a steady limiting of the charge is able to be realized instead. In an advantageous manner, the predefined air/fuel mixture ratio may already take into account an enrichment that may be required for reasons of component protection, thereby increasing the driving comfort.

It is especially advantageous if the maximally possible injection duration is ascertained as a function of the instantaneous state of the internal combustion engine, in particular from an instantaneous value of an engine speed of the internal combustion engine. In this manner, in anticipation of a full-load operating state, it is possible to specify a restriction of the air supply in a partial-load operating state already, in such a way that the maximally possible injection duration is still sufficient to realize the predefined air/fuel mixture. Abrupt shifts to lower torques in the full-load range, which interfere with driving comfort, are avoided in this manner. On the other hand, the air supply is restricted to the absolutely necessary minimum.

In an advantageous manner, the air supply may be influenced via a throttle-valve control, which triggers a first actuator to control the air supply. With the aid of this first actuator, in particular a throttle valve, the air supply may be reduced relatively quickly if the throttle valve is controlled in the closing direction.

The air supply may also be influenced in an advantageous manner via a possibly provided charge-pressure control, which triggers a second actuator to control the air supply. With the aid of this second actuator, especially a bypass around a turbine of an exhaust turbocharger, or by means of a variable turbine geometry, the air supply is able to be reduced relatively slowly if the bypass is controlled in the opening direction or if the variable turbine geometry is triggered for the opening of the guide blades.

It is particularly advantageous if both the first actuator and the second actuator are available and the charge is reduced more rapidly via the first actuator and lowered more slowly via the second actuator, and if the second actuator activates the first actuator again in the opening direction upon reduction of the charge. This allows the fuel consumption to be reduced.

In addition, it is advantageous if a driving pedal of a vehicle driven by the internal combustion engine is scaled as a function of the maximally possible air charge. This makes it possible, especially at full loading, to avoid an abrupt reduction of the charge of the internal combustion engine assigned to the driving-pedal position so as to realize an enrichment of the air/fuel mixture for the described component protection. As a result, a charge of the internal combustion engine may be assigned to the particular driving-pedal position in an unambiguous manner, such charge also not changing abruptly at an identical driving-pedal position, so that the driving comfort is increased.

Another advantage results if the maximally possible air charge is converted into a maximally possible output variable of the internal combustion engine, in particular into a maximally possible torque, and if a maximally possible position of the driving pedal is assigned to this maximally possible output variable. In anticipation of the full-load operating state of the internal combustion engine, the driver wish ascertained via the driving-pedal position may thus be limited to a value of the output variable, especially a torque, at which the maximally possible injection duration of the at least one injection valve is still sufficient to implement this driver wish, such limiting already being implemented in a partial-load operating state of the internal combustion engine. This avoids abrupt switches to lower values for the output variable, in particular to lower torques, in the full-load operating state of the internal combustion engine, which are disruptive. On the other hand, the lowering of the output variable, in particular the torque, is limited to the absolutely minimum, since this lowering conforms exactly to the maximally possible injection duration, which is not the case in the abrupt lowering according to the related art.

DETAILED DESCRIPTION

Figure 1:
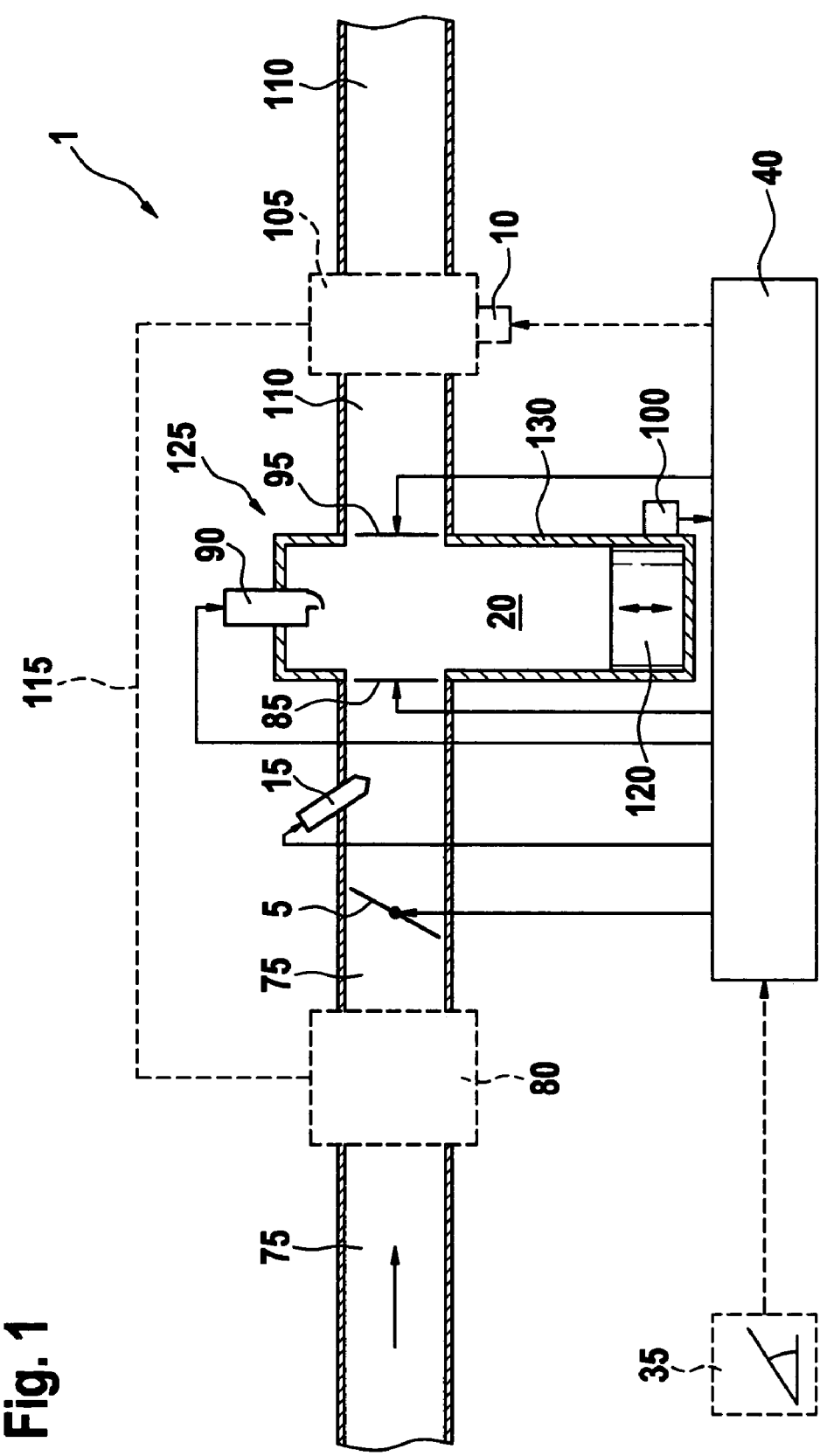
FIG. 1 shows a block diagram of an internal combustion engine.

Reference number 1 in FIG. 1 denotes an internal combustion engine having a combustion engine 125 such as a spark-ignition engine. Internal combustion engine 1 may drive a motor vehicle, for instance. In this example, combustion engine 125 includes one or several cylinders of which one, bearing reference numeral 130, is shown in FIG. 1 by way of example. Fresh air is able to be supplied to a combustion chamber 20 of cylinder 130 via an air feed 75 and an injection valve 85. A throttle valve 5, which adjusts the air supply to combustion chamber 20 of cylinder 130, is disposed in air feed 75. Via an engine control 40, throttle valve 5 is controlled to adjust a predefined opening degree, which engine control 40 ascertains as a function of a position of a driving pedal 35 in order to convert a driver wish corresponding to the driving-pedal position in the manner known to one skilled in the art. According to the example described in FIG. 1, an injector 15 injects fuel into air feed 75 between throttle valve 5 and intake valve 85. This section of air feed 75 is also known as intake manifold. As an alternative, the fuel could also be injected directly into combustion chamber 20 of cylinder 130 with the aid of a fuel injector. The fuel quantity to be injected is adjustable via an instant for the injection start and an injection duration, given a constant and known injection pressure. In the process, engine control 40 specifies the instant for the beginning of the injection and for the injection duration as a function of an oxygen concentration in the exhaust gas, in such a way that a predefined air/fuel mixture ratio is adjusted. The air/fuel mixture arriving in combustion chamber 20 of cylinder 130 is ignited by a spark plug 90 whose ignition instant is likewise specified by engine control 40 as a function of the operating state of internal combustion engine 1 and in a manner known to one skilled in the art. The combustion of the air/fuel mixture in combustion chamber 20 drives a piston 120 of cylinder 130, this piston 120 driving a crankshaft (not shown in FIG. 1) whose rotational speed is recorded by an engine-speed sensor 100 and forwarded to engine control 40. The exhaust gas generated in combustion chamber 20 of cylinder 130 during combustion of the air/fuel mixture is expelled into an exhaust tract 110 of internal combustion engine 1 via a discharge valve 95. Intake valve 85 and discharge valve 95 may be opened and closed in a known manner via engine control 40 as shown in FIG. 1, or via one or several camshafts. As an alternative, which is illustrated in FIG. 1 in the form of a dotted line, an exhaust-gas turbocharger may be provided whose turbine 105 in exhaust tract 110 is driven by the exhaust-gas mass flow. Via a shaft 115, the turbine motion is transmitted to a compressor 80 in air feed 75, which in this manner compresses the air supplied to combustion chamber 20 of cylinder 130. The compressor output or the charge pressure of the exhaust-gas turbocharger may be influenced via an actuator 10. Actuator 10 may be embodied, for instance, as bypass valve in a bypass which guides the exhaust-gas mass flow past turbine 105. The opening degree of the bypass valve determines the portion of the exhaust-gas mass flow that is guided past turbine 105 and will not contribute to the compressor output. As an alternative, in the case of an exhaust-gas turbocharger having variable turbine geometry, actuator 10 may influence the compressor output, and thus the charge pressure, also by adjustment of the guide blades of turbine 105. Actuator 10, too, is controlled by engine control 40 to achieve the desired compressor output or the desired charge pressure. According to FIG. 1, compressor 80 is disposed in the flow direction of the fresh air in front of throttle valve 5, the flow direction being marked by an arrow. The output of internal combustion engine 1 may be influenced by varying the setting of throttle valve 5 and/or actuator 10.

As described, the time available for an injection of fuel into a combustion chamber of an internal combustion engine is limited. In systems with an injection in front of the intake valves of the combustion chamber, as shown in FIG. 1 for one cylinder by way of example, the entire injection must be completed before individual intake valve 85 closes. The injection for the next aspiration of cylinder 130 may then begin. In gasoline direct injection, the injection begins after intake valve 85 has been closed, but must be completed prior to ignition. The maximum injection duration gets shorter with increasing engine speed. For that reason, injection valves are designed such that they are still able to discharge the required injection quantity at maximum rotational speed and full loading of the internal combustion engine. They are tightly configured so that fuel is able be metered with sufficient precision at idling speed without loading as well. Especially in the case of supercharged internal combustion engines an enrichment of the air/fuel mixture may become necessary at high engine speed and high loading for reasons of component protection. Given the described tight tolerances of the injection valves, the available time is then insufficient to discharge the increased injection quantity for the enrichment.

For that reason, according to the present invention, the maximally possible injection duration for an injection operation of the at least one injection valve 15 is ascertained first. A variable characterizing the output of internal combustion engine 1 is limited as a function of the maximally possible injection duration by appropriate adjustment of throttle valve 5 and/or actuator 10. This ensures compliance with the maximally possible injection duration without sudden drop in the output of the internal combustion engine at full load, for instance, and with a required enrichment of the air/fuel mixture ratio.

In particular, it is then possible to ascertain, as a function of the maximally possible injection duration and a predefined air/fuel mixture ratio, a maximally possible air charge of combustion chamber 20 as a variable characterizing the output of internal combustion engine 1, and to limit the setting of throttle valve 5 and/or actuator 10 as a function of the maximally possible air charge. In this way, the maximally possible air charge may be restricted from the beginning, namely to such an extent that the maximally possible injection duration is unable to be exceeded, with the result that an enrichment of the air/fuel mixture possibly required in the full-load operating state of internal combustion engine 1, will not require an abrupt reduction of the air charge. The air/fuel mixture ratio predefined for the purpose of ascertaining the maximally possible air charge of combustion chamber 20 should be selected such that an enrichment required for component protection, for instance, already is taken into account.

The maximally possible injection duration may be determined in an advantageous manner as a function of the current operating state of internal combustion engine 1. In this way, it is possible, already in an instantaneous operating state corresponding to a partial-load operating state, to ascertain the maximally possible air charge for a full-load operating state on the basis of this instantaneous partial-load operating state; this allows the maximally possible air charge to be limited in an anticipatory manner to a value at which the maximally possible injection duration will still be sufficient to implement the predefined air-fuel mixture ratio. In such a manner, a distracting abrupt reduction of the air charge in the full-load range is avoided. In addition, it is ensured that in such a full-load operating state the maximally possible air charge will also be available and will not be undershot by a return jump of the air charge determined independently of the maximally possible injection duration.

The maximally possible air charge will then be the input signal for a throttle-valve control and/or a charge-pressure control (if available). If, for the purpose of limiting the air charge to the maximally possible air charge determined as a function of the maximally possible injection duration and the specified air/fuel-mixture ratio, the air charge needs to be lowered, this may be implemented more rapidly if throttle valve 5 rather than actuator 10 is used for a charge-pressure reduction, and thus a charge reduction. If both the throttle-valve control and the charge-pressure control are available, such a reduction in the air charge may be implemented both by corresponding control of throttle valve 5 and corresponding control of actuator 10, the reduction of the charge with the aid of throttle valve 5 being faster than the reduction of the charge pressure. As soon as the slower charge-pressure reduction has a noticeable effect on the charge reduction, throttle valve 5 may once again be moved in the opening direction so as to reduce the fuel consumption.

Furthermore, it may be provided that the maximally possible air charge be converted into a maximally possible value of an output variable of internal combustion engine 1, in particular a maximally possible torque, and be entered in a scaling of driving pedal 35 in which the driver wish, expressed by the driving-pedal position, is scaled such that the maximally possible value for the output variable ascertained in this manner—in this case for the torque—is assigned to the maximum driving-pedal position. In this way, the torque corresponding to the driver wish, hereinafter also called driver-desired torque, may be limited already in a partial-load operating state of internal combustion engine 1, in an anticipatory manner, to the maximally possible torque at which the injection duration is still sufficient to adjust the predefined air/fuel-mixture ratio. As described earlier for the air charge, this increases the driving comfort since distracting abrupt shifts to lower torques in the full-load range are avoided. On the other hand, the possibly required reduction of the torque is restricted to the absolutely minimum. As an alternative to the torque, a power output or some other variable derived from the torque and/or the power output may be used as output variable. The output variable, too, thus represents a variable characterizing the output of internal combustion engine 1, which is limited by an appropriate setting of throttle valve 5 and/or actuator 10 in order to maintain the maximally possible injection duration.

Figure 2:
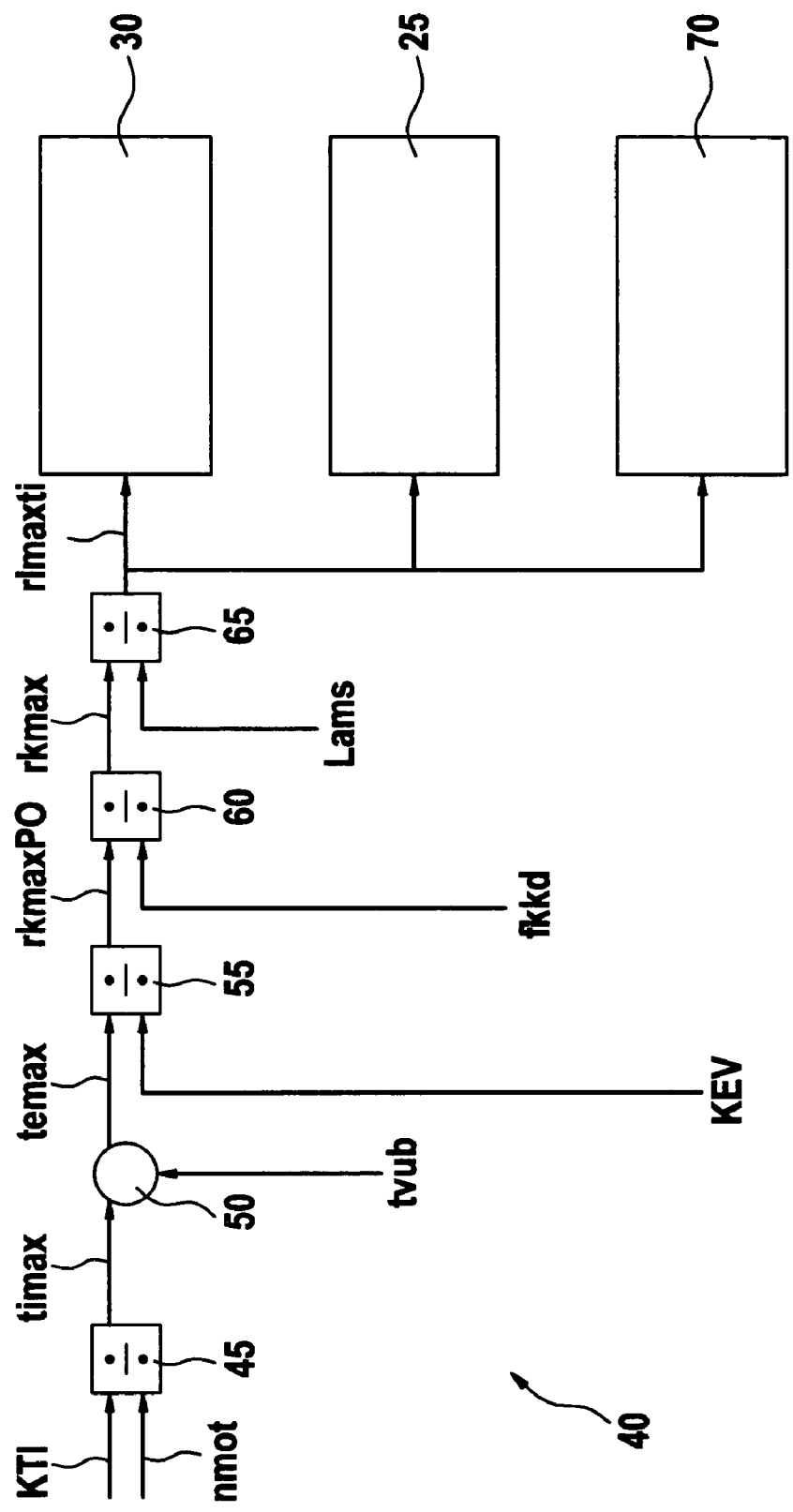
FIG. 2 shows a flow chart to elucidate the method according to the present invention and the device according to the present invention.

On the basis of the flow chart shown in FIG. 2, the sequence of the method according to the present invention will be explained in the following; the flow chart may be implemented in engine control 40 in the form of software and/or hardware. In the intake-manifold injection illustrated in FIG. 1, dimensionless constant KTI corresponds to the maximally possible injection duration up to the time when intake valve 85 is closed, given one rotation of the crankshaft per minute and thus an engine speed of 1/minute. Constant KTI is predefined and known in engine control 40. It may be ascertained on a test stand, for instance. In a first division element 45 constant KTI is divided by current engine speed nmot [rotations/minute], the current engine speed nmot being ascertained by engine-speed sensor 100. At the output of first division element 45, this will result in the maximally possible injection duration timax for current engine speed nmot as $$timax = KTI/nmot \quad (1).$$

Maximally possible injection duration timax for instantaneous engine speed nmot is then reduced in a subtraction element 50 by a pick-up delay correction time tvub. Pick-up delay correction time tvub is the time that elapses from the triggering of injection valve 15 until the complete opening of injection valve 15. Pick-up delay correction time tvub may also be ascertained on a test stand, for instance. By subtracting pick-up delay correction time tvub from maximally possible injection duration timax, a maximally possible effective injection time temax results at the output of subtraction element 50 as $$temax = timax - tvub \quad (2).$$

Also stored in engine control 40 is a flow-rate constant KEV of injection valve 15, which is likewise ascertainable on a test stand, for example, or which is specified by the manufacturer and describes in what time period a known predefined standardized fuel mass is spray-discharged. If one divides maximally possible effective injection duration temax by flow-rate constant KEV in a second division element 55, one obtains a maximally possible relative fuel charge rkmaxPO of combustion chamber 20, which is related to the standardized fuel mass and results at a predefined known standard pressure in the fuel system. The fuel system includes the fuel pump and the fuel-supply line to injector valve 15, which are not illustrated in FIG. 1. Maximally possible relative fuel charge rkrmaxPO thus results as $$rkmaxPO = temax/KEV \quad (3).$$

Maximally possible relative fuel charge rkmaxPO has the dimension of a mass and will then be divided in a third division element 60 by a dimensionless correction factor fkkd for the actual fuel pressure. The actual fuel pressure is able to be ascertained by a fuel pressure sensor in the region of injection valve 15, such a fuel pressure sensor not being shown in FIG. 1 for reasons of clarity. In systems without fuel-pressure sensor, the described correction will not be possible. In this way the actual fuel pressure is taken into account. The correlation between the measured fuel pressure and dimensionless correction factor tkkd with respect to the relative fuel charge may be ascertained on a test stand, for instance.

Resulting at the output of third division element 60 thus is maximally possible relative fuel charge rkmax, which considers the actual fuel pressure, as $$rkmax = rkmaxPO/fkkd \quad (4).$$

Maximally possible relative fuel charge rkmax, which takes the actual fuel pressure into account, is then divided in a fourth division element 65 by predefined (dimensionless) air/fuel-mixture ratio Lams, the so-called lambda value. The predefined air/fuel-mixture ratio may already consider an enrichment for the purpose of component protection. Resulting at the output of fourth division element 65 therefore is maximally possible air charge rlmaxti of combustion chamber 20 at which the required fuel mass is also able to be spray-discharged and which is associated with maximally possible relative fuel charge rkmax that takes the actual fuel pressure into account. Maximally possible air charge rlmaxti of combustion chamber 20 thus results at the output of fourth division element 65 as $$rlmaxti = rkmax/Lams \qquad (5).$$

Maximally possible relative air charge rlmaxti is entered into throttle-valve control 25 and limits the setpoint charge from which the associated throttle-valve angle is calculated in throttle-valve control 25. In the event that a charge-pressure control 30 is present, as indicated in the exemplary embodiment according to FIG. 1 by the exhaust-gas turbocharger denoted by the dashed line, maximally possible relative air charge rlmaxti may also be input variable of charge-pressure control 30 where it also restricts the setpoint charge from which the setpoint charge pressure for the triggering of actuator 10 is calculated. Furthermore, maximally possible relative air charge rlmaxti may be input variable of a driver-pedal scaling 70 where it restricts the driver-desired torque to a maximally possible torque derived from maximally possible relative air charge rlmaxti, the maximally possible torque being used to implement the driver-pedal scaling, i.e., the maximally possible driver-pedal position is assigned to this maximally possible torque. The derivation of the maximally possible torque from maximally possible relative air charge rlmaxti is carried out in a manner known to one skilled in the art. The maximally possible driver-pedal position is thus matched to the current maximally possible torque.

What is claimed is:

1. A method for operating an internal combustion engine having at least one actuator for influencing an output of the internal combustion engine and at least one injection valve for supplying a fuel to the internal combustion engine, comprising:
    ascertaining a maximally possible injection duration for an injection operation of the at least one injection valve;
    limiting a variable as a function of the maximally possible injection duration by a corresponding adjustment of the at least one actuator, the variable characterizing the output of the internal combustion engine;
    ascertaining a maximally possible air charge in a combustion chamber of the internal combustion engine as a variable characterizing the output of the internal combustion engine as a function of the maximally possible injection duration and a predefined air/fuel mixture ratio; and
    limiting a setting of the at least one actuator as a function of the maximally possible air charge.

2. The method as recited in claim 1, further comprising:
    ascertaining the maximally possible injection duration as a function of a current operating state of the internal combustion engine.

3. The method as recited in claim 2, wherein the current operating state includes an instantaneous value for an engine speed of the internal combustion engine.

4. The method as recited in claim 1, further comprising:
    triggering a first actuator of the at least one actuator to influence an air supply by way of a throttle-valve control.

5. The method as recited in claim 4, further comprising:
    triggering a second actuator of the at least one actuator to influence the air supply by way of a charge-pressure control.

6. The method as recited in claim 1, further comprising:
    scaling a driving pedal of a vehicle driven by the internal combustion engine as a function of the maximally possible air charge.

7. The method as recited in claim 6, further comprising:
    converting the maximally possible air charge into a maximally possible output variable of the internal combustion engine corresponding to a maximally possible torque; and
    assigning a maximally possible position of the driving pedal to the maximally possible output variable.

8. A method for operating an internal combustion engine having at least one actuator for influencing an output of the internal combustion engine and at least one injection valve for supplying a fuel to the internal combustion engine, comprising:
    ascertaining a maximally possible injection duration for an injection operation of the at least one injection valve;
    limiting a variable as a function of the maximally possible injection duration by a corresponding adjustment of the at least one actuator, the variable characterizing the output of the internal combustion engine;
    triggering a first actuator of the at least one actuator to influence an air supply by way of a throttle-valve control;
    triggering a second actuator of the at least one actuator to influence the air supply by way of a charge-pressure control;
    lowering a charge by the first actuator;
    lowering the charge by the second actuator at a rate that is more slow than that by which the first actuator lowers the charge; and
    actuating the first actuator again in an opening direction by the second actuator upon lowering of the charge.

9. A device for operating an internal combustion engine, that includes at least one actuator for influencing an output of the internal combustion engine and at least one injection valve for supplying a fuel to the internal combustion engine, the device comprising:
    means for ascertaining a maximally possible injection duration for an injection operation of the at least one injection valve;
    means for limiting a variable as a function of the maximally possible injection duration by a corresponding adjustment of the at least one actuator, the variable characterizing the output of the internal combustion engine;
    means for ascertaining a maximally possible air charge in a combustion chamber of the internal combustion engine as a variable characterizing the output of the internal combustion engine as a function of the maximally possible injection duration and a predefined air/fuel mixture ratio; and
    means for limiting a setting of the at least one actuator as a function of the maximally possible air charge.

* * * * *